US011323477B1

(12) United States Patent
Kumar et al.

(10) Patent No.: US 11,323,477 B1
(45) Date of Patent: May 3, 2022

(54) ESTABLISHING SECURE CONNECTIONS TO INSTANCES IN PRIVATE SUBNETS OF A CLOUD PROVIDER NETWORK

(71) Applicant: Amazon Technologies, Inc., Seattle, WA (US)

(72) Inventors: Vikash Kumar, Redmond, WA (US); Rishabh Varshney, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 16/916,456

(22) Filed: Jun. 30, 2020

(51) Int. Cl.
*H04L 29/06* (2006.01)

(52) U.S. Cl.
CPC ........ *H04L 63/168* (2013.01); *H04L 63/0263* (2013.01); *H04L 63/0272* (2013.01); *H04L 63/0442* (2013.01); *H04L 63/068* (2013.01); *H04L 63/102* (2013.01)

(58) Field of Classification Search
CPC ............... H04L 63/168; H04L 63/0263; H04L 63/0272; H04L 63/0442; H04L 63/068; H04L 63/102; H04L 63/029; H04L 12/4641; H04L 63/0281; H04L 9/3263; H04L 29/06965
See application file for complete search history.

(56) References Cited

U.S. PATENT DOCUMENTS

| | | | | |
|---|---|---|---|---|
| 9,215,075 | B1 * | 12/2015 | Poltorak | .................. H04L 63/04 |
| 2004/0264465 | A1 * | 12/2004 | Dunk | .................. H04L 63/0442 |
| | | | | 370/392 |
| 2013/0174246 | A1 * | 7/2013 | Schrecker | ........... H04L 63/1433 |
| | | | | 726/14 |
| 2015/0058916 | A1 * | 2/2015 | Rostami-Hesarsorkh | .................... |
| | | | | H04L 69/162 |
| | | | | 726/1 |
| 2015/0188927 | A1 * | 7/2015 | Santhi | ................. H04L 67/1002 |
| | | | | 726/4 |
| 2015/0222604 | A1 * | 8/2015 | Ylonen | ................... H04L 9/083 |
| | | | | 713/171 |
| 2016/0134423 | A1 * | 5/2016 | Harjula | ................. H04L 9/3247 |
| | | | | 713/176 |
| 2017/0093820 | A1 * | 3/2017 | Ferguson | .............. H04L 9/0825 |

OTHER PUBLICATIONS

Asanga, G. D. D. Public Key and Multi Factor Based Centralized SSH Authentication System for a Cloud Based Environment Using LDAP. Diss. 2017. (Year: 2017).*

* cited by examiner

*Primary Examiner* — Techane Gergiso
(74) *Attorney, Agent, or Firm* — Nicholson De Vos Webster & Elliott LLP

(57) ABSTRACT

Techniques are described for enabling users to establish Secure Shell (SSH) connections with compute instances running in private subnets of virtual private networks of a cloud provider network. A "bastion" compute instance, including an SSH server and specialized SSH client software, is used to enable connections to compute instances in a private subnet of a virtual private network. A bastion instance is a server designed to be a primary point of access from the internet (e.g., by its inclusion in a public subnet of a virtual private network) and acts as a proxy for compute instances running in a private subnet of a virtual private network. The ability for a bastion instance to establish connections to instances in a private subnet is based on a role attached to the bastion instance, where the role may be defined using an identity and access management service of the cloud provider network.

20 Claims, 8 Drawing Sheets

ESTABLISHING SECURE CONNECTIONS TO INSTANCES IN PRIVATE SUBNETS OF A CLOUD PROVIDER NETWORK

BACKGROUND

A cloud provider network enables users to use a variety of computing-related resources such as compute resources, storage resources, networking resources, and the like. Users can also create virtual private networks used to logically isolate cloud computing resources in a virtual network. Within such virtual private networks, users can create subnets and launch compute instances and other resources into the defined subnets. The subnets associated with a virtual private network can include private-facing subnets used to host instances without direct connectivity to public networks such as the internet, for example, to increase the security posture of instances within a private-facing subnet.

BRIEF DESCRIPTION OF DRAWINGS

Various embodiments in accordance with the present disclosure will be described with reference to the drawings, in which.

DETAILED DESCRIPTION

Figure 1:
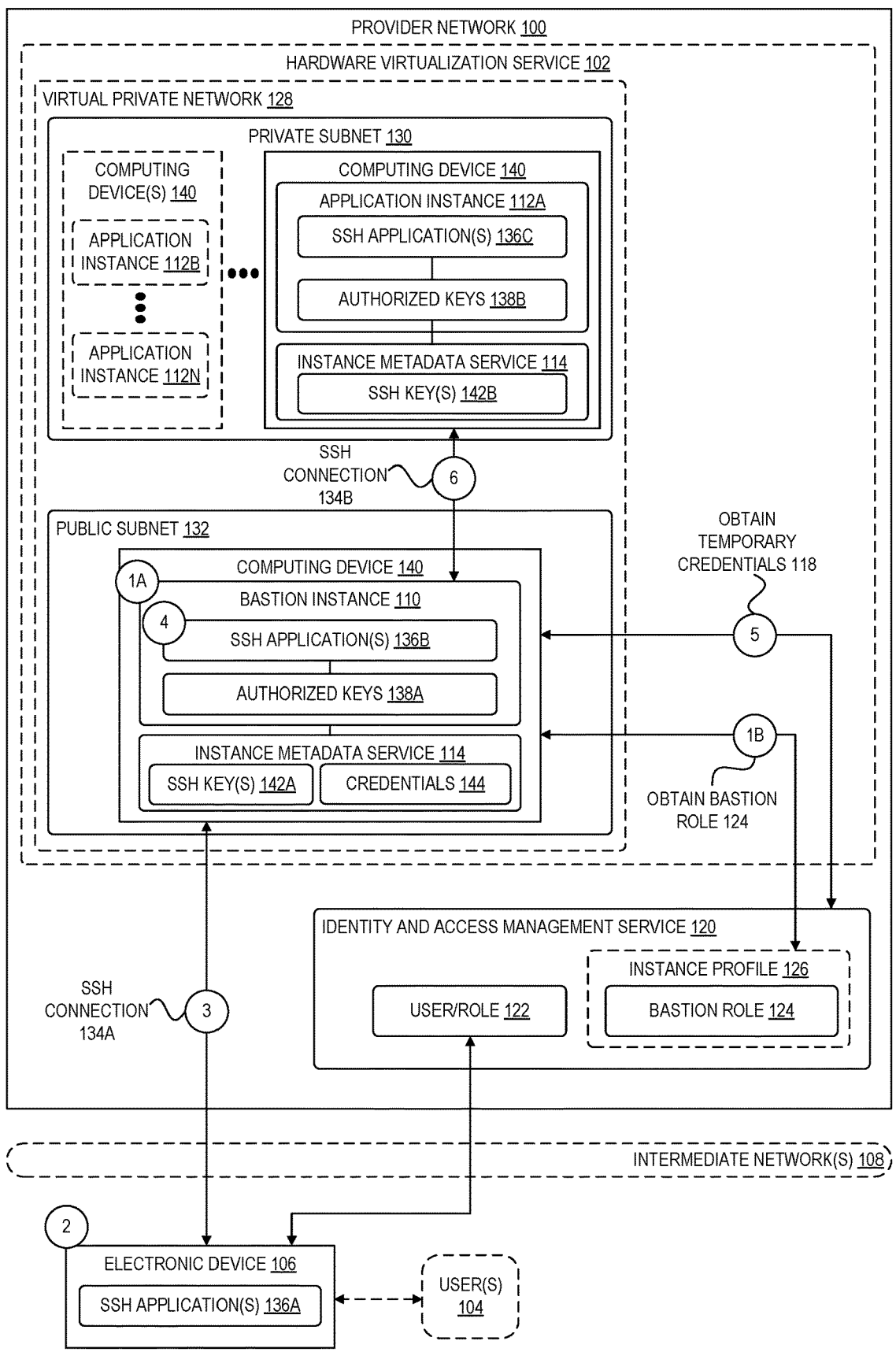
FIG. 1 is a diagram illustrating an environment for enabling users to establish secure connections to compute instances in private-facing subnets of a virtual private network provided by a cloud provider network according to some embodiments.

The present disclosure relates to methods, apparatus, systems, and non-transitory computer-readable storage media for enabling users to establish Secure Shell (SSH) connections with compute instances running in private-facing subnets of virtual private networks provisioned within a cloud provider network. According to some embodiments, a "bastion" compute instance, including an SSH server and specialized SSH client software, is used to enable connections to instances in a private subnet of a virtual private network. In this context, a bastion instance (or bastion server) is a server designed to be a primary point of access from the internet (e.g., by its inclusion in a public-facing subnet of a virtual private network) and acts as a proxy for one or more compute instances running in a private subnet of a virtual private network. In some embodiments, the ability for a bastion instance to establish connections to compute instances in a private subnet is based on an identity and access management-related "role" attached to the bastion instance. The attached role, for example, is associated with an access policy configuration including permissions that allow the bastion instance to connect to the compute instances in the private subnet. The role further enables the bastion instance to automatically obtain, from an instance metadata service of the cloud provider network, security credentials used by the provider network to authenticate and authorize interactions between the bastion instance and the instances in the private subnet. Using the bastion instance in this manner, users can readily establish SSH connections to instances in private subnets of a virtual private network without the need to manage authorized keys at the bastion instance or at the instances in a private subnet, and without the need to setup a cumbersome single-pass infrastructure, among other benefits.

Users of a cloud provider network often make use of virtual private networks (sometimes also referred to as "virtual private clouds") to logically isolate their computing resources provisioned in a cloud computing network. For example, a user can use various services of a cloud provider network to launch compute instances, database instances, and other resources into a virtual private network managed by the user. In some embodiments, users can configure the networking setup of such virtual private networks, including the configuration of subnets, route tables, internet gateways, and the like, in a manner similar to the administration of a traditional network in an on-premises environment.

As indicated, once a user has created a virtual private network, the user can add one or more subnets to the virtual private network, where each subnet represents a logical division of an Internet Protocol (IP) network associated with the virtual private network and can be associated with its own routing and security configurations. These subnets can generally include public subnets (e.g., where compute instances in a private subnet generally are reachable from the internet) and private subnets (e.g., where compute instances in a private subnet generally are not reachable from the internet). A user, for example, might place various backend application instances, database instances, and other instances that do not need to accept incoming traffic from the internet in a private subnet of a virtual private network so that network access to the instances can be more tightly controlled (e.g., to allow network connections only from devices in the same private subnet or from devices an associated public subnet).

Users that launch compute instances into a private subnet of a virtual private network however may often desire to directly interact with the instances using computing devices on a network outside of the virtual private network. For example, a user using a computing device on a public network may desire to interact remotely with compute instances in a private subnet, for example, to configure the instances, to execute local commands, etc. Users might typically use an SSH client application to establish a secure connection from a client computing device to a remote compute instance in order to perform such actions. SSH, for example, is a cryptographic network protocol that provides for secure channels over unsecured networks and that enables users to use remote command line interfaces (CLIs), to remotely execute commands at an instance, and more generally to provide security for any network service involving a client computing device and a remote instance.

However, because the compute instances in a private subnet of a virtual private network generally are not reachable from networks outside of the virtual private network, the ability to establish a SSH connection directly between a computing device on a public network and an instance in a private subnet requires additional configuration. As indicated above, in some embodiments, users can enable such access using a "bastion" instance that is placed in a public-facing subnet of a virtual private network. In this arrangement, the bastion instance is able to reach one or more of the instance in the private subnet and can thereby act as a proxy to instances in the private subnet for computing devices on external networks.

Although the use of a bastion instance to connect to instances in a private subnet as described above enables users to reduce the number of administrative access points to only the bastion instance, existing techniques for configuring such bastion instances to act as an SSH proxy nevertheless remain cumbersome and error prone. For examples, users desiring to configure such a bastion instance for use as an SSH proxy are typically required to launch and configure the bastion instance with appropriate networking configurations, to setup a single-pass infrastructure to appropriate managed authorized key files used by SSH daemons at both the bastion instance and at any private-facing application instances, configure SSH agent forwarding, among other configurations. The ongoing management of authorized keys at multiple instances, configuration of single pass infrastructures, and other configurations, often result in misconfigured and insecure bastion instance environments.

The aforementioned challenges, among others, are addressed by techniques described herein for enabling users to establish SSH connections to instances in a private-facing subnet in a manner that avoids the need for users to manage authorized keys used by the SSH daemons at bastion instances or instances in the private subnets. In some embodiments, a specialized SSH client application provided by an operator of a cloud provider network enables users to readily establish SSH connections to bastion instances in a public subnet of a virtual private network. As described in more detail herein, in some embodiments, the specialized SSH client application automatically generates temporary public/private key pairs, publishes public keys to instances to which SSH connections are desired, and establishes the SSH connections using the temporary keys, thereby alleviating users from key management. Furthermore, in some embodiments, a bastion instance is further attached to a role associated with permissions that enable the bastion instance to automatically obtain, from an instance metadata service of the cloud provider network, temporary security credentials that enable the bastion instance to establish connections with instances in a private subnet. The bastion server similarly includes a specialized SSH client application that generates a public/private key pair, publishes the public key to instances in the private subnet, and establish SSH connections with the instances.

FIG. 1 is a diagram illustrating an environment in which a user establishes, via a configured bastion instance, an SSH connection with an application instance running in a private subnet of a virtual private network of a cloud provider network according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 102 that can execute compute instances, a storage service that can store data objects, etc. The users (or "customers") of provider networks 100 may utilize one or more user accounts that are associated with a customer account, though these terms may be used somewhat interchangeably depending upon the context of use. Users 104 may use various computing devices (e.g., an electronic device 106) to interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network 100. APIs can also enable different services of the cloud provider network to exchange data with one another. The interface(s) may be part of, or serve as a front-end to, a control plane of the cloud provider network 100 that includes "backend" services supporting and enabling the services that may be more directly offered to customers.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network 100 via a publicly accessible network (e.g., the Internet, a cellular communication network), e.g., by way of a transit center (TC). TCs are the primary backbone locations linking customers to the cloud provider network 100 and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network 100 may deliver content from points of presence (or "POPs") outside of, but networked with, these regions by way of edge locations and regional edge cache servers. This compartmentalization and geographic distribution of computing hardware enables the cloud provider network 100 to provide low-latency resource access to customers on a global scale with a high degree of fault tolerance and stability.

Generally, the traffic and operations of a cloud provider network 100 may be broadly subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, cloud provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The cloud provider network 100 illustrated in FIG. 1 includes a hardware virtualization service 102. The hardware virtualization service 102 (referred to in various implementations as an elastic compute service, a virtual machines service, a computing cloud service, a compute engine, or a cloud compute service) can enable users of the provider network 100 to provision and manage compute resources such as virtual machine instances (e.g., including a bastion instance 110 and application instances 112A, 112B, . . . , 112N) running on various computing devices (e.g., computing devices 138). Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the hardware virtualization service 102 includes an instance metadata service 114 that executes on computing devices of the hardware virtualization service 102. The instance metadata service 114 is a service accessible to compute instances provided by the hardware virtualization service 102 and enables an instance to obtain instance metadata about itself. For example, a provisioned instance can send a request (e.g., a request associated with a fixed Uniform Resource Link (URL) or other endpoint identifier of the instance metadata service 114) to obtain information including an identifier of the instance, an identifier of a region in which the instance is located, an instance type associated with the instance, among other possible types of metadata. In some embodiments, compute instances of a hardware virtualization service 102 are able to obtain from the instance metadata service 114 various types of security credentials (e.g., usernames and passwords, access keys, public/private key pairs, etc.). In some embodiments, the types of security credentials available to an instance from an instance metadata service 114 include temporary security credentials (e.g., stored as temporary security credentials 118 as part of instance metadata 116 for a particular instance), where temporary security credentials include an access key identifier, a secret access key, and a security token (sometimes also referred to as a session token) that encodes information about a temporary session associated with the credentials (e.g., where the session information may include role or policy information associated with the credentials, an expiration time for the credentials, etc.). In some embodiments, the hardware virtualization service 102, identity and access management service 120, or other component of the cloud provider network 100 can inject such security credentials into the instance metadata associated with an instance, where the instance can then obtain the security credentials as desired. In some embodiments, the hardware virtualization service 102 further manages the rotation of credentials stored by the instance metadata service 114 so that users of an instance can be alleviated from such key management tasks.

In some embodiments, the cloud provider network 100 also includes an identity and access management service 120. The identity and access management service 120 enables users to manage access to cloud provider network 100 services and resources. For example, using an identity and access management service 120, a user associated with a cloud provider network account can create and manage additional users and groups to be associated with the user's account, and can further define permissions associated with each user or group to allow and deny access to computing resources, service APIs, and other cloud resources. The identity and access management service 120 also enables users to add other user access conditions, such as time of day controls, originating IP address restrictions, requirements to Secure Sockets Layer (SSL) protected connections, and multi-factor authentication (MFA) device configurations. The identity and access management service 120 can also be used to grant users and applications federated access to the cloud provider network 100 using existing identity systems (e.g., any identity management solution that supports Security Assertion Markup Language (SAML) 2.0 or other authentication and/or authorization standard).

In some embodiments, the identity and access management service 120 further enables users to create "roles" associated with an account of the cloud provider network 100 that can be used to manage access to cloud provider network services and resources. For example, a user of the cloud provider network 100 can be assigned individual security credentials (e.g., passwords, access keys, multi-factor authentication devices, etc.) or users can be provided with temporary security credentials that enable users to access cloud provider network 100 services and resources. As indicated above, such permissions can be managed to control which resources and operations a user or entity can access and perform. In some embodiments, a user-defined role (e.g., a user/role 122 or bastion role 124) is instead associated with permissions used to control which operations can be performed by an entity (e.g., a user, application, or cloud provider service) that assumes the role. In some embodiments, users also define which entity or entities are permitted to assume a defined role.

In some embodiments, a role created by a user using the identity and access management service 120 can be granted to applications that run on a compute instance provided by a hardware virtualization service 102. For example, to grant applications on a compute instance of the hardware virtualization service 102 the ability to access other resources in the cloud provider network 100, developers might distribute their long-term credentials (e.g., passwords or access keys) to each instance. The applications could then use those developer-provided credentials to access resources such as storage resources or data stored in a database. However, several potential security risks are associated with distributing long-term credentials to each of a developer's instance. Instead, users can create a role as described above, attach the role to the user's instances, and those instances are then able to obtain temporary security credentials associated with the attached role, e.g., from an instance metadata service 114. These temporary security credentials obtained based on a role attached to an instance can then be used by applications running on the instance.

In some embodiments, an instance provisioned by a hardware virtualization service 102 uses an instance profile (e.g., instance profile 126) as a container for a user-defined role. The instance profile can then be used to pass role information to instance when the instance starts (e.g., a bastion role 124 can be passed to the bastion instance 110 upon launch). In some embodiments, an application on the instance can retrieve the security credentials provided by the role from instance metadata, as described above, by accessing a particular instance metadata item associated with the role. In this manner, the application is granted the permissions for the actions and resources that have been defined for the role through the security credentials associated with the role. As indicated above, the security credentials are temporary and are rotated automatically. In some embodiments, for applications running on an instance, various types of application resources provided by an operator of the cloud provider network (e.g., CLIs, software development kits (SDKs), etc.) may obtain the temporary security credentials automatically on behalf of the user or application desiring to use the credentials (e.g., to make an API request or to otherwise interact with a service or resource of the cloud provider network).

As indicated above, it is sometimes desirable for users (e.g., a user 104) to use a computing device (e.g., one or more electronic device(s) 106) on a public network (e.g., any network outside of the virtual private network 128) to establish an SSH connection with an instance on a private subnet (e.g., an application instance 112A in the private subnet 130 in FIG. 1). The numbered circles "1"-"6" in FIG. 1 illustrate a process involving a user 104 using an SSH client application 136A running computing device to establish a first SSH connection 134A with a bastion instance 110 running on a computing device 140 in a public subnet 132 of the virtual private network 128, and further establishing a second SSH connection 134B with an application instance 112A running in a private subnet 130. As described in more detail herein, in some embodiments, the bastion instance 110 establishes the second SSH connection 134B with the application instance 112A in the private subnet 130 based on temporary security credentials 118 obtained from an instance metadata service 114, where the temporary security credentials enable an SSH client application 136B running on the bastion instance 110 to send a public key of a public/private key pair to an SSH application 136C (e.g., including an SSH daemon or server) running on an application instance 112A (e.g., for storage as part of an authorized keys 138B file).

In some embodiments, at circle "1A," a bastion instance 110 is launched and configured to enable the bastion instance 110 to establish SSH connections with authorized computing devices outside of the virtual private network 128 (e.g., one or more electronic device(s) 106 associated with authorized users 104) and to establish SSH connections with one or more compute instances in a private subnet 130 of the virtual private network 128 (e.g., one or more of application instances 112A, 112B, . . . , 112N).

In some embodiments, at circle "1B," the bastion instance 110 is attached to a bastion role 124 managed by an identity and access management service 120, where the bastion role 124 is optionally contained in an instance profile 126. The bastion instance 110 may obtain the bastion role 124 at the time the instance is launched or more generally at any point in time after the bastion instance 110 is launched. In some embodiments, the configuration of a bastion instance 110 includes the creation of the instance profile 126, bastion role 124, or both, and the creation of associated policy configurations including permissions that allow the bastion instance 110 to perform the operations described above. In some embodiments, a user uses the identity and access management service 120 to create the instance profile 126 and/or bastion role 124, for example, using a web-based console, CLI, APIs, or other interface provided by the service. Below is an example of a policy definition enabling a bastion instance 110 to connect to an instance in a private subnet:

```
{
    "Version": "2020-06-15",
    "Statement": [
        {
            "Effect": "Allow",
            "Action": "hvs-instance-connect:SendSSHPublicKey",
            "Resource":
"arn:csp:hvs:${CSP::Region}:${CSP::AccountId}:instance/:*
            "Condition":{
                "StringEquals":{
                    "hvs: osuser":"hvs-user",
                    "csp: ResourceTag/InstanceType":"Application"
                }
            }
        },
        {
            "Effect":"Allow",
            "Action":"hvs: DescribeInstances",
            "Resource":"*"
        }
    ]
}
```

In some embodiments, the security posture of the bastion instance 110 and instances in the private subnet can be further improved by attaching a static IP address to the bastion instance 110 and updating the policy to restrict access to instances in the private subnet 130 from only bastion instances associated with the defined static IP address(es). As another example, in some embodiments, compute instances in a private subnet of a virtual private network can be assigned to one or more security groups, where a security group can be created that permits SSH connections from one or more bastion instances, and where instances in a private subnet to which such connections are to be permitted can be assigned to the security group.

In some embodiments, at circle "2," a user 104 uses an SSH application 136A (e.g., an SSH client application, which may be implemented as a CLI, as part of web-based console, or any other type of application) to establish an SSH connection 134A with the bastion instance 110. In some embodiments, the SSH application 136A includes a specialized application provided by an operator of the cloud provider network 100 or other entity, where the application is configured to act as a wrapper over a standard CLI specifically for establishing SSH connections to compute instances provisioned by a hardware virtualization service 102. In some embodiments, in response to a user request to establish an SSH connections with a compute instance, the SSH application 136A generates a public/private key pair in memory, publishes the public key of the key pair to instance metadata associated with the instance (e.g., where such an operation is permitted based on a user or role assumed by the SSH application 136A), uses the private key of the key pair to establish the SSH connection, and then optionally discards the key pair. For example, in some embodiments, the public/private key pair generated by the SSH application 136A may be a temporary key pair that expires after a defined period of time (e.g., after one minute), after which time the private key is deleted and the public key is removed from any instance metadata at which it is stored. If a new SSH connection is requested after the expiration of a key pair, a new key pair is generated by the application 136A. In some embodiments, to enable the SSH application 136A to send public keys to the bastion instance 110, as described above, a policy is associated with a user/role 122 used by a user of the SSH application 136A that permits such an action. Below is an example of a policy definition that permits the SSH application 136A to send public keys to a bastion instance 110:

```
{
    "Version": "2020-06-15",
    "Statement": [
        {
            "Effect": "Allow",
            "Action": "hvs-instance-connect:SendSSHPublicKey",
            "Resource":
"arn:csp:hvs:${CSP::Region}:${CSP::AccountId}:instance/:*
            "Condition":{
                "StringEquals":{
                    "hvs: osuser":"hvs-user",
                    "csp: ResourceTag/InstanceType":"Bastion"
                }
            }
        },
        {
            "Effect":"Allo",
            "Action":"hvs: DescribeInstances",
            "Resource":"*"
        }
    ]
}
```

In some embodiments, at circle "3" in FIG. 1, an SSH connection 134A is established between the electronic device 106 and the bastion instance 110. For example, as described above, the connection may be established by the client SSH application 136A and an SSH daemon or server running as part of the SSH application(s) 136B on the bastion instance 110 using a temporary public/private key pair generated by the SSH application 136A and published to the computing device's instance metadata (e.g., stored as part of SSH key(s) 142A at the instance metadata service 114 of the computing device hosting the bastion instance 110). In some embodiments, the SSH application 136A obtains the SSH key from the instance metadata and stores it as part of authorized keys 138A. In some embodiments, authorized keys 138A is a file that specifies the public keys that can be used to log into an account for which the authorized keys file is configured (e.g., the authorized keys 138A file may be configured in association with a user account of a user 104). Once the public key is stored as part of authorized keys 138A, the client SSH application 136A can use the corresponding private and SSH protocol to establish the SSH connection 134A. A user 104 can then securely issue commands and perform other actions at the bastion instance 110 via the SSH connection 134A once the connection is established.

In some embodiments, at circle "4," a client SSH application 136B initiates the establishment of an SSH connection 134B with an application instance 112A. For example, a user may request the establishment of the SSH connection 134B using a CLI, web-based console, or other interface enabled by the SSH connection 134A to the bastion instance 110. In some embodiments, for example, the initiation of the SSH connection 134B is responsive to a user command, e.g., "mssh <ip-address>", where the <ip-address> is the IP address of the application instance 112A. In some embodiments, the establishment of the SSH connection 134B may be performed automatically responsive to a command entered by the user using an SSH application 136A at the electronic device 106. For example, a user using an SSH application 136A can enter an SSH command identifying both the bastion instance 110 and an instance the private subnet 130 (e.g., application instance 112A in the example of FIG. 1) to which the user ultimately desires a connection. For example, in some embodiments, an example mssh command "mssh-b <bastion-instance-id/ip><application-instance-id/ip>" may be used that specifies both an identifier of the bastion instance 110 and application instance 112A.

In some embodiments, the establishment of the SSH connection 134B includes the bastion instance 110 obtaining temporary security credentials 144 from instance metadata, where the temporary security credentials are associated with a policy that permits the bastion instance 110 to send public keys to the application instance 112A (e.g., send public keys to an instance metadata service 114 running on the computing device hosting the application instance 112A. For example, as described above, a bastion role 124 is attached to the bastion instance 110, where the role is associated with the policy permitting the bastion instance 110 to connect to the application instance 112A and where the attached role further enables the bastion instance 110 to obtain temporary security credentials 118 based on the role from the instance metadata service 114.

For example, in some embodiments, at circle "5," the SSH application 136B automatically obtains the temporary security credentials 118 from instance metadata 116 associated with the bastion instance 110, as described above. In other embodiments, the bastion instance 110 is configured with long-term credentials that enable the bastion instance 110 to connect to the application instance 112A and to publish a public key to the authorized keys 138B managed by an SSH daemon/server at the application instance 112A. As indicated above, to establish the SSH connection 134B at circle "6," the SSH application 136B (which may include a specialized SSH client application as illustrated by SSH application 136A) generates a temporary public/private key pair, publishes the public key to the application instance 112A to be stored as part of SSH key(s) 142B (e.g., which is permitted based on the policy associated with the role attached to the bastion instance 110), and connects to the application instance 112A using the generated private key.

In the example illustrated in FIG. 1, the bastion instance 110 is able to establish the SSH connection 134B with the application instance 112A based on the attached bastion role 124 its associated policies and permissions. Any user with permissions to establish an SSH connection to the bastion instance 110 is thus able to establish an SSH connection to an instance in a private subnet to which the bastion instance 110 is permitted access. However, in some cases, an administrator of the instances in one or more private subnets of a virtual private network 128 may desire more fine-grained control over which users have access to which application instances via a bastion instance 110. For example, an administrator may desire for one or more "developer" users to have SSH access only to one or more first application instances used for application development and further desire for one or more "tester" users to have SSH access only to one or more second application instances used for testing purposes.

Figure 2:
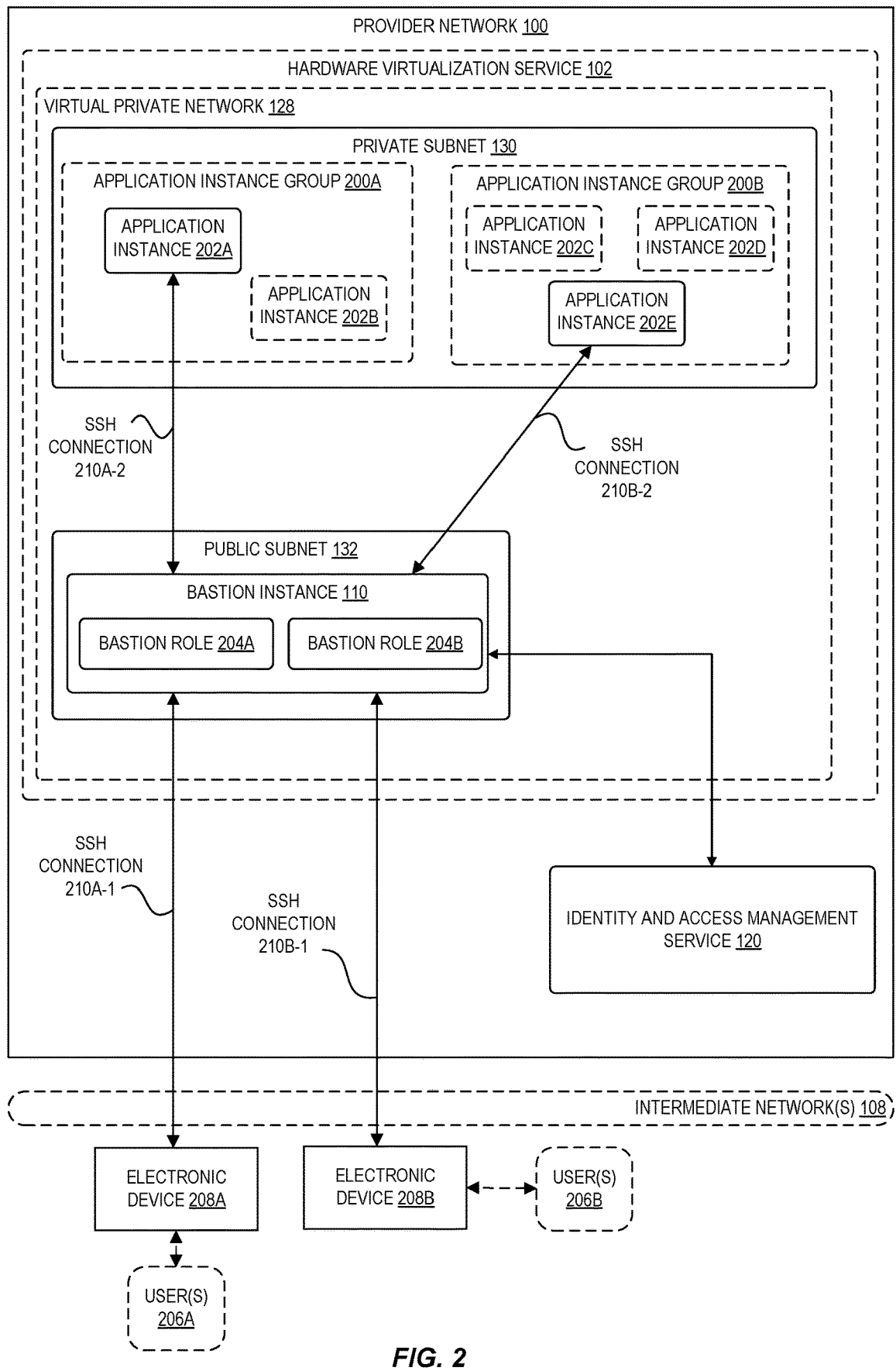
FIG. 2 is a diagram illustrating an environment including a bastion instance to which multiple identity and access management roles are attached thereby enabling user-based control of SSH access to instances within one or more private subnets of a virtual private network according to some embodiments.

In some embodiments, to enable the types of control over specific user access to specific instances in private subnets as described above, a hardware virtualization service 102 and identity and access management service 120 enable the attachment of multiple roles to a bastion instance 110, where each attached role may associated with a policy that defines the applications instances to which a specified set of one or more users or user groups have access. In this manner, different sets of temporary credentials can be provided to a bastion instance 110, each associated with different permissions, depending on a user establishing a connection to the bastion instance 110. FIG. 2 is a diagram illustrating an environment in which multiple roles are attached to a bastion instance thereby enabling user-based control of SSH access to instances within one or more private subnets of a virtual private network according to some embodiments.

In FIG. 2, one or more private subnets 130 includes multiple application groups including an application group 200A (e.g., containing application instances 202A and 202B) and an application groups 200B (e.g., containing application instances 202C, 202D, and 202E). For example, the application group 200A may include instances that are accessible to a first group of users (e.g., developer users) while the application group 200B includes instances accessible to a second group of users (e.g., tester users). Although the example shown in FIG. 2 illustrates the application instance groups as distinct groups, the set of instances to be accessible to different users or groups of users can be overlapping. Furthermore, while a single private subnet 130 is shown, a virtual private network 128 may include any number of separate private subnets containing compute instances to which access control is desired.

In some embodiments, to control user access to certain sets of application instances in private subnets, the bastion instance 110 in FIG. 2 is attached to two separate bastion roles, a bastion role 204A and a bastion role 204B. In this example, each of the separate bastion roles is associated with a separate policy configuration that permits access by a defined set of users to a selected set of application instances in one or more private subnets of the virtual private network 128. In some embodiments, based on each of the separate bastion roles, the bastion instance 110 is able to obtain temporary security credentials from an instance metadata service 114, where the temporary security credentials are stored in a directory associated with a specific user that has established a connection to the bastion instance 110. For example, if a first user 206A uses an electronic device 208A to establish an SSH connection 210A-1 to the bastion instance 110, as described above in reference to FIG. 1, the bastion instance 110 can determine that the user 206A is associated with a first bastion role 204A and obtain temporary security credentials from the instance metadata accordingly. The temporary security credentials obtained based on the bastion role 204A, for example, enable connections only to application instances to which the user 206A has been granted permission to access (e.g., an application instance 202A).

Similarly, a second user 206B using an electronic device 208B to establish an SSH connection 210B-1 to the bastion instance 110 is associated with a second bastion role 204B. The second bastion role 204B enables the bastion instance 110 to obtain temporary security credentials from the instance metadata service, where the credentials enable connections only to application instances to which the user 206B has been granted permission to access (e.g., an application instance 202E). In this manner, the attachment of two or more roles to a bastion instance 110 enable a same bastion instance to manage users' ability to SSH into defined subsets of an instance fleet running in one or more private subnets of a virtual private network 128.

Figure 3:
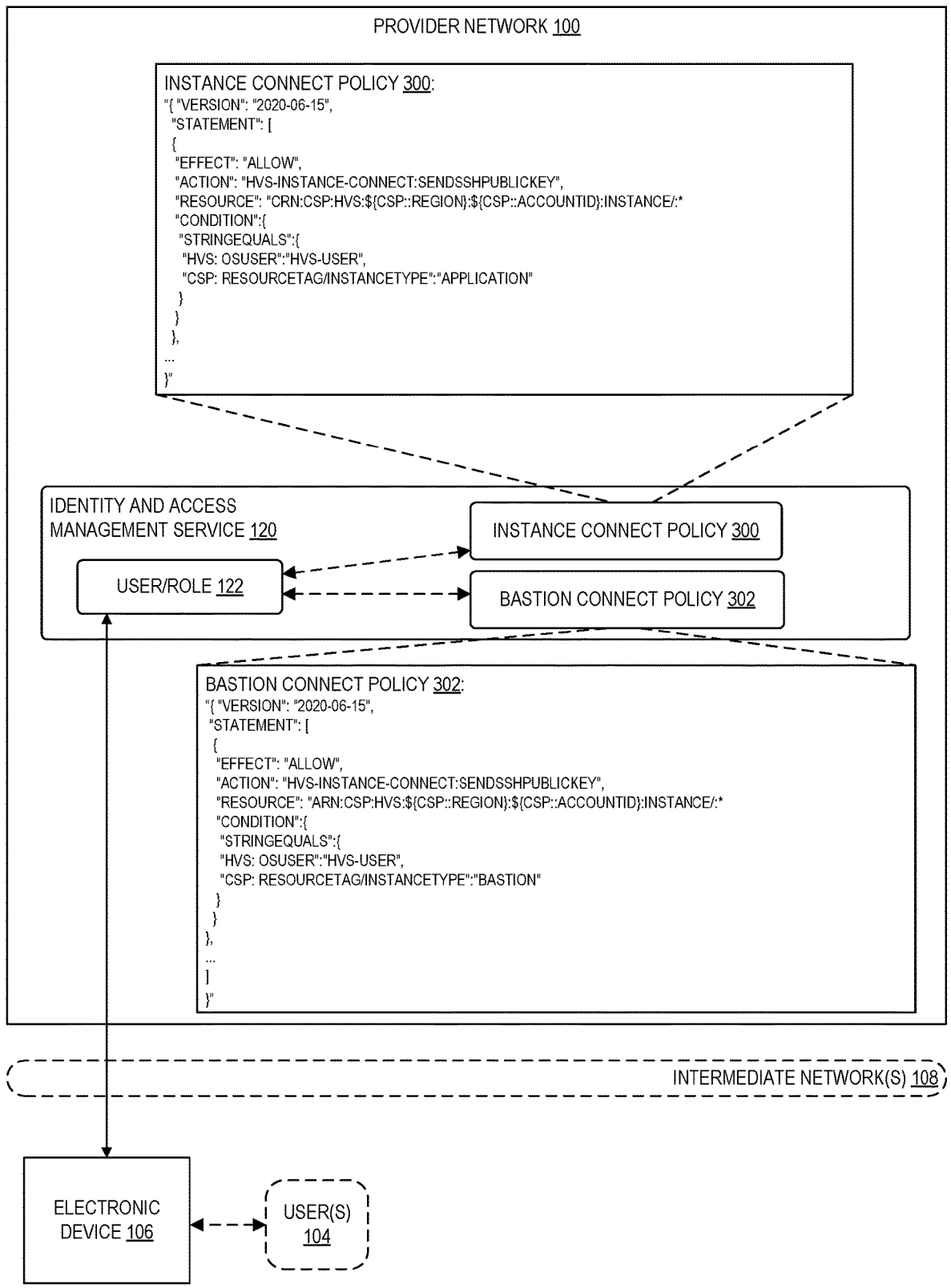
FIG. 3 is a diagram illustrating the attachment of multiple policies to a user or role that enables the user or role to establish connections to instances in a private subnet using SSH agent forwarding according to some embodiments.

In some embodiments, the ability to create user-based access controls to specific subsets of an application instance fleet running in one or more private subnets of a virtual private network 128 involves attaching multiple policy configurations to a user or role and using SSH agent forwarding to control which application instances the user can access. FIG. 3, for example, illustrates the attachment of multiple policies to a user or role that define a user's ability to access application instances in one or more private subnets of a virtual private network. As illustrated, a user/role 122 has two separate policies attached to it: a bastion connect policy 302 that enables a user associated with the user/role 122 to send SSH public keys to a bastion instance, and an instance connect policy 300 that enables a user associated with the user/role 122 to send SSH public keys to one or more application instances running in private subnet(s) of a virtual private network. For example, the instance connect policy 300 allows the user to perform the "SendSSHPublicKey" action (e.g., an API action provided by a hardware virtualization service 102 that enables a requestor to send a public key to an instance, where the instance can use the public key to establish SSH connections based on a corresponding private key) with respect to instances with the "Application" tag, while the bastion connect policy 302 similarly allows the user to perform the "SendSSHPublicKey" action with respect to instances with the "Bastion" tag.

Figure 4:
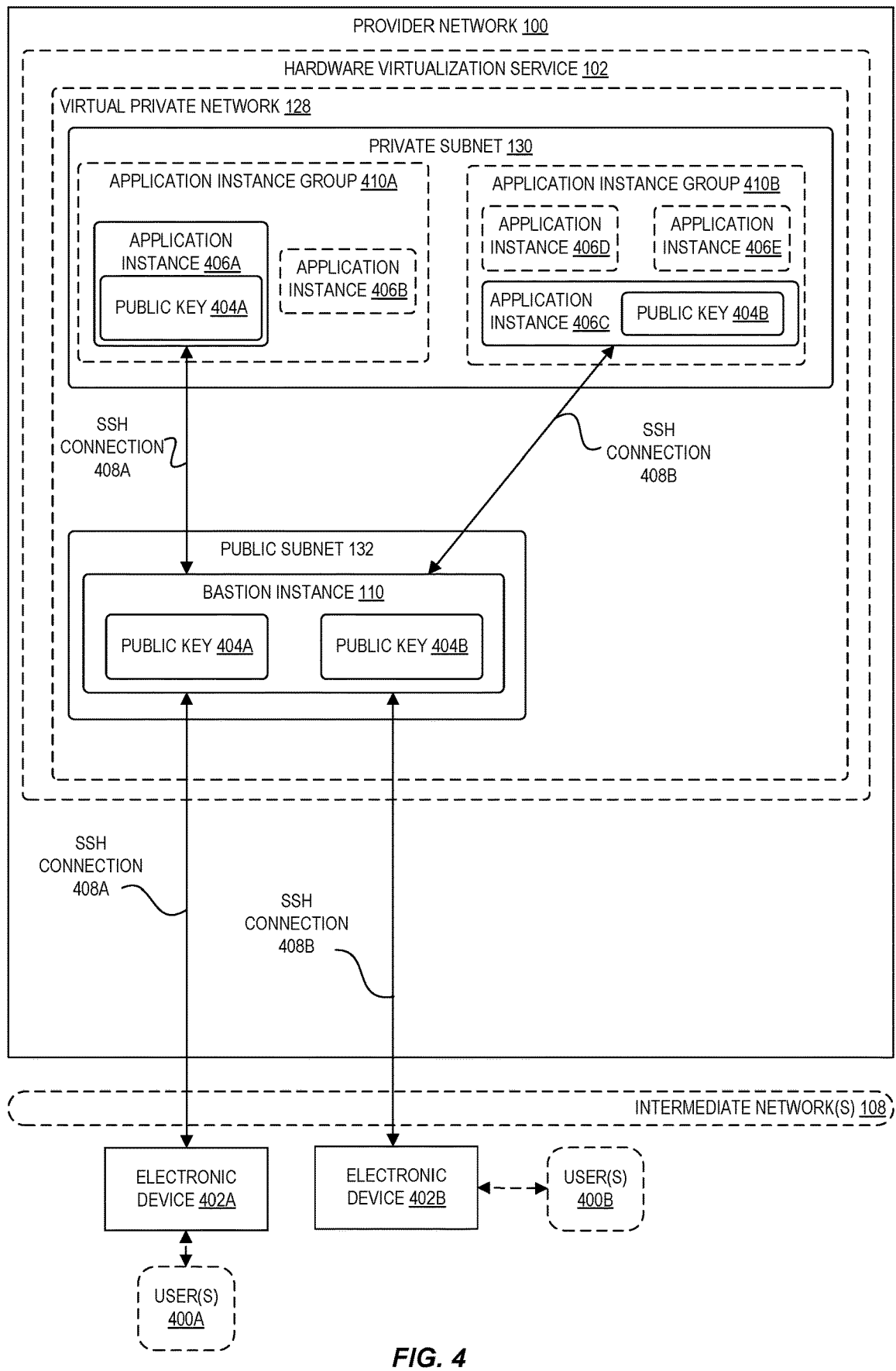
FIG. 4 is a diagram illustrating an environment in which the attachment of policies to a user or role can be used with SSH agent forwarding to control access to instances in a private subnet of a virtual private network according to some embodiments.

FIG. 4 is a diagram illustrating an environment in which the attachment of policies to a user or role can be used with SSH agent forwarding to control access to instances in a private subnet of a virtual private network. In the example of FIG. 4, each of users 400A and 400B is associated with a user/role that is further associated with multiple policy configurations as illustrated in FIG. 3. For example, a user 400A may be associated with first policies that enable the user to use an SSH client application running on an electronic device 402A to send SSH public keys to the bastion instance 110 and to an application instance 406A (and possibly to other application instances of a defined application instance group 410A such as application instance 406B). Similarly, a second user 400B may be associated with second policies that enable the user to use an SSH client application running on an electronic device 402B to send SSH public keys to the bastion instance 110 and to an application instance 406C (and possibly to other application instances of an application instance group 410B, such as application instance 406D and application instance 406E).

In some embodiments, the ability for a user to send public keys to both a bastion instance 110 and to one or more specified application instances running in one or more private subnets of a virtual private network enables the use of SSH agent forwarding to establish connections from devices on a public network to the instances in the private subnets. For example, once a public key of a public/private key pair generated by an SSH client application running on an electronic device 402A is present on both a bastion instance 110 and an application instance 406A, an SSH "agent" running on the bastion instance 110 can forward SSH messages originating from the electronic device 402A to the application instance 406A, and vice versa. In some embodiments, the bastion instance 110 and the appropriate application instances are able to obtain the public keys sent from a device from instance metadata 116 for each of the instances. Thus, access to particular application instances of a private subnet can be controlled in this manner based on which users have permissions to send public keys to which application instances. For example, a user 400A with permissions to send public keys to an application instance 406A can establish an SSH connection 408A with the application instance 406A based on a public key 404A sent to both the application instance 406A and bastion instance 110, while a user 400B with permissions to send public keys to an application instance 406C can establish an SSH connection 408B with the application instance 406C based on the public key 404B sent to both the application instance 406C and the bastion instance 110.

Figure 5:
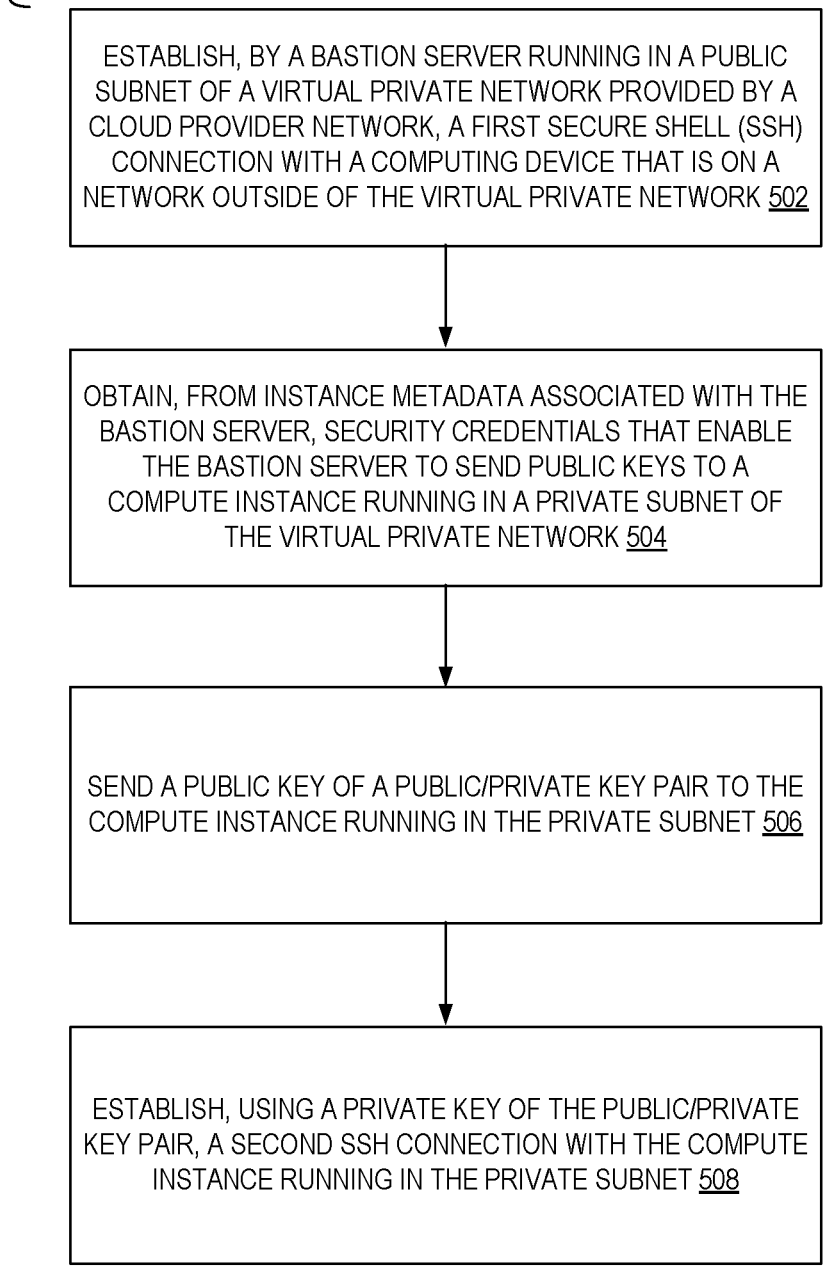
FIG. 5 is a flow diagram illustrating operations of a method for enabling users to establish secure connections with application instances running in private-facing subnets of a virtual private network via a bastion instance according to some embodiments.

FIG. 5 is a flow diagram illustrating operations 500 of a method for enabling users to establish secure connections with application instances running in private-facing subnets of a virtual private network via a bastion instance according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a bastion instance 110 of the other figures.

The operations 500 include, at block 502, establishing, by a bastion server running in a public subnet of a virtual private network provided by a cloud provider network, a first Secure Shell (SSH) connection with a computing device that is on a network outside of the virtual private network.

The operations 500 further include, at block 504, obtaining, from instance metadata associated with the bastion server, security credentials that enable the bastion server to send public keys to a compute instance running in a private subnet of the virtual private network. In some embodiments, the security credentials are obtained from the instance metadata by an SSH application running on the bastion server, and wherein the SSH application establishes the second SSH connection with the compute instance running in the private subnet.

The operations 500 further include, at block 506, sending a public key of a public/private key pair to the compute instance running in the private subnet.

The operations 500 further include, at block 508, establishing, using a private key of the public/private key pair, a second SSH connection with the compute instance running in the private subnet.

In some embodiments, the security credentials are first security credentials associated with a first role attached to the bastion server by an identity and access management service of the cloud provider network, wherein the compute instance is a first compute instance, and wherein the first role is associated with a first user and permits the bastion server to send public keys to the first compute instance but does not permit the bastion server to send public keys to a second compute instance running in the private subnet, and wherein the operations further include: attaching a second role to the bastion server, wherein the second role is associated with a second user of the cloud provider network and permits the bastion server to send public keys to the second compute instance; obtaining second security credentials based on the second role; and establishing a third SSH connection with the second compute instance running in the private subnet, wherein the third SSH connection is associated with the second user of the cloud provider network.

In some embodiments, the security credentials are associated with a role attached to the bastion server by an identity and access management service of the cloud provider network, wherein the role is associated with a policy configuration managed by the identity and access management service and that defines permissions for entities assuming the role to perform actions within the cloud provider network, and wherein the policy configuration includes a policy that permits the bastion server to send public keys to the compute instance and to establish SSH connections with the compute instance.

In some embodiments, each of the security credentials and the public/private key pair is temporary and expires after a defined period of time.

In some embodiments, wherein the compute instance running in the private subnet is a first compute instance, and wherein the operations further include: receiving, by the bastion server, a request to establish a third SSH connection with a second compute instance running in the private subnet, wherein the request to establish the third SSH connection requests to use SSH agent forwarding to establish the third SSH connection, and wherein the bastion server and the second compute instance both have stored a same public key; and establishing the third SSH connection using SSH agent forwarding.

In some embodiments, the computing device is a first computing device, wherein the same public key is stored at both the bastion server and the second compute instance based on requests sent from a second computing device associated with a role managed by an identity and access management service of the cloud provider network, and wherein the role is associated with a policy that permits entities assuming the role to send public keys to both the bastion server and the second compute instance.

In some embodiments, the first SSH connection is established responsive to a request received from a SSH client application running on the computing device, and wherein the SSH client application is provided by an operator of cloud provider network, and wherein the SSH client application generates a temporary public/private key pair used to establish the first SSH connection.

In some embodiments, the private subnet includes a plurality of compute instances including the compute instance, and wherein the bastion server is associated with a role provided by an identity and access management service of the cloud provider network and that permits the bastion server to establish SSH connections with any of the plurality of compute instances.

In some embodiments, the bastion server establishes the second SSH connection responsive to a request, received from the computing device via the first SSH connection, to establish the second SSH connection.

In some embodiments, the compute instance is assigned to a security group of the virtual private network, and wherein the security group includes a rule that permits SSH connections from the bastion server.

Figure 6:
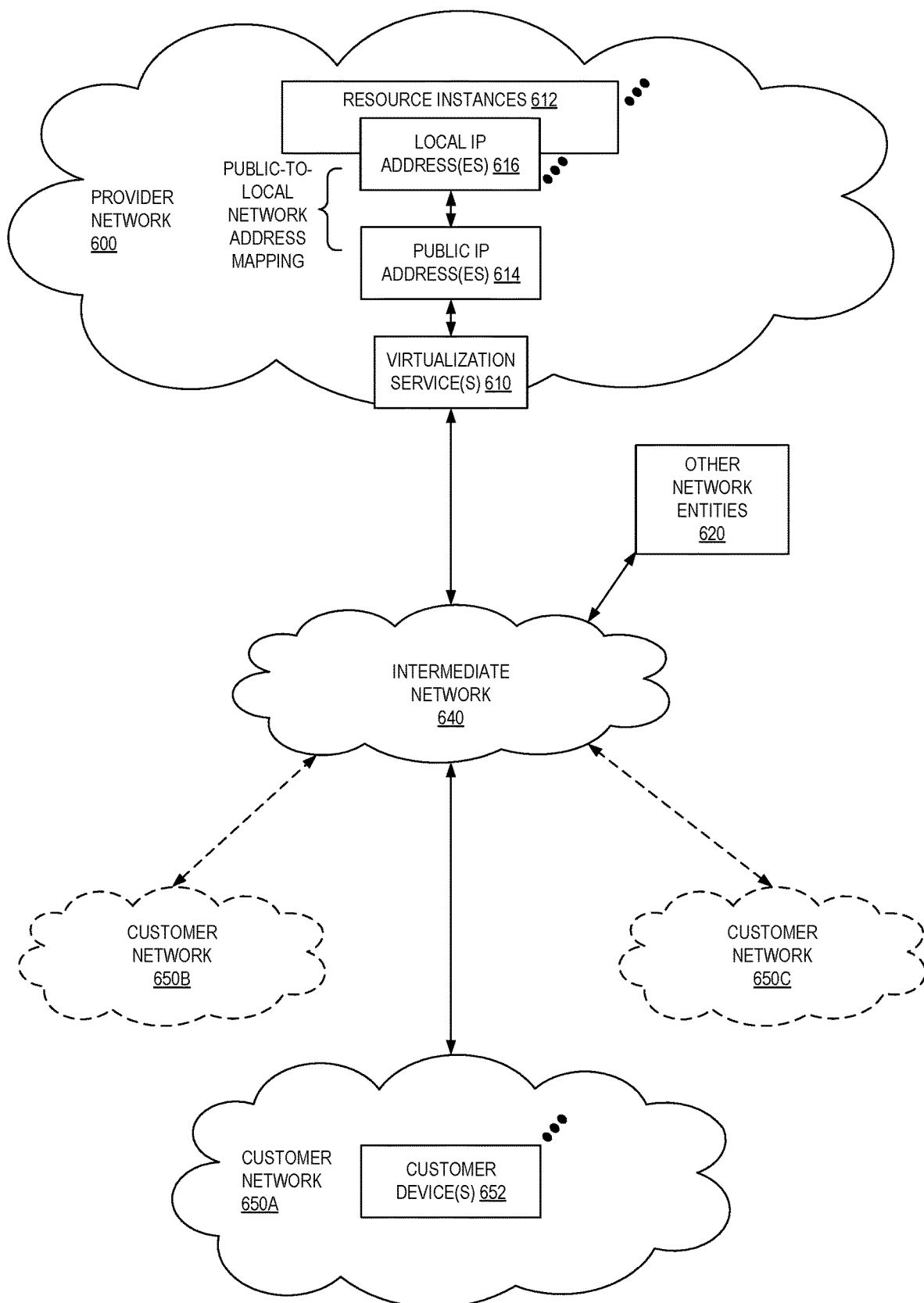
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
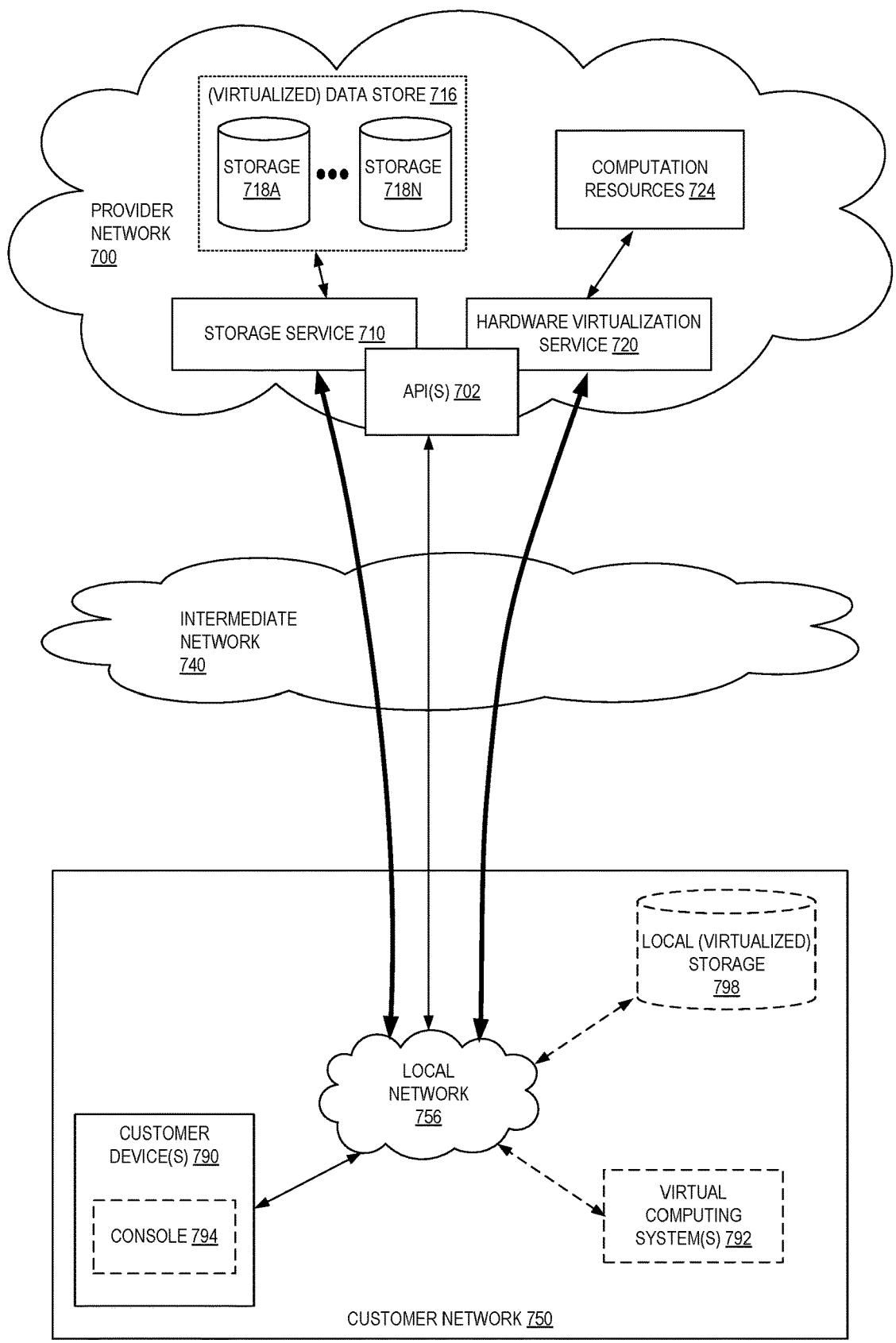
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
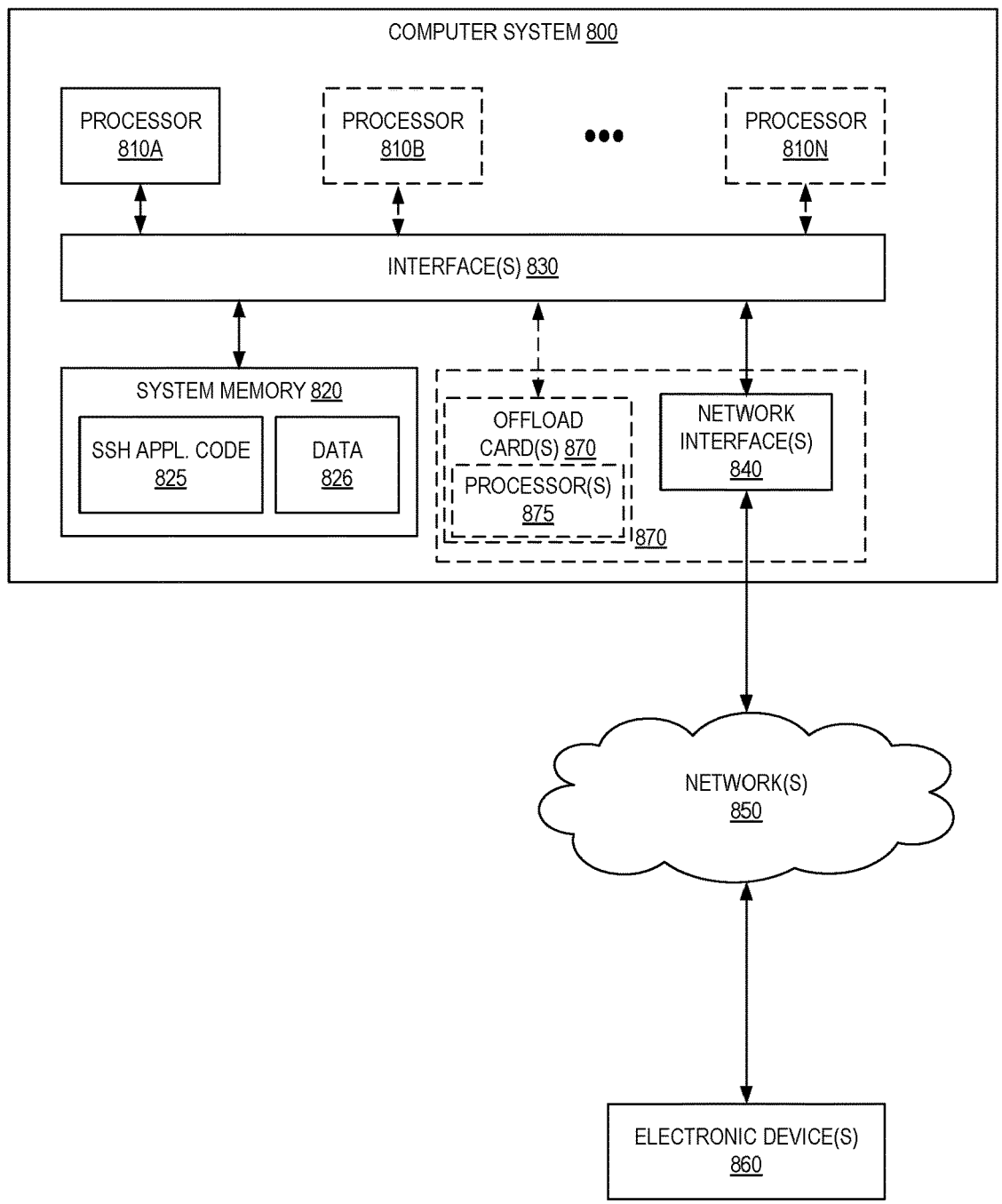
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as SSH application code 825 (e.g., executable to implement, in whole or in part, an SSH application 136B) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   establishing, by a bastion server running in a public subnet of a virtual private network provided by a cloud provider network, a first Secure Shell (SSH) connection with a computing device, wherein the computing device is on a network that is outside of the virtual private network;
   obtaining, by an SSH application running on the bastion server, security credentials that enable the bastion server to send public keys to a compute instance running in a private subnet of the virtual private network, wherein the security credentials are obtained from instance metadata associated with the bastion server, and wherein the security credentials are associated with a policy configuration that permits the bastion server to send public keys to the compute instance and to establish SSH connections with the compute instance;
   generating a public/private key pair including a private key and a public key;
   sending the public key to the compute instance running in the private subnet; and
   establishing, using the private key, a second SSH connection with the compute instance running in the private subnet.

2. The computer-implemented method of claim 1, wherein the security credentials are first security credentials, wherein the compute instance is a first compute instance, wherein a first role associated with a first user of the cloud provider network permits the bastion server to send public keys to the first compute instance but does not permit the bastion server to send public keys to a second compute instance running in the private subnet, and wherein the method further comprises:
  attaching a second role to the bastion server, wherein the second role is associated with a second user of the cloud provider network and permits the bastion server to send public keys to the second compute instance;
  obtaining second security credentials based on the second role; and
  establishing a third SSH connection with the second compute instance running in the private subnet, wherein the third SSH connection is associated with the second user of the cloud provider network.

3. The computer-implemented method of claim 1, wherein the policy configuration is associated with a role attached to the bastion server, and wherein the role defines permissions for entities assuming the role to perform actions within the cloud provider network.

4. A computer-implemented method comprising:
  establishing, by a bastion server running in a public subnet of a virtual private network provided by a cloud provider network, a first Secure Shell (SSH) connection with a computing device that is on a network outside of the virtual private network;
  obtaining, from instance metadata associated with the bastion server, security credentials that enable the bastion server to send public keys to a compute instance running in a private subnet of the virtual private network;
  sending a public key of a public/private key pair to the compute instance running in the private subnet; and
  establishing, using a private key of the public/private key pair, a second SSH connection with the compute instance running in the private subnet.

5. The computer-implemented method of claim 4, wherein the security credentials are first security credentials associated with a first role attached to the bastion server by an identity and access management service of the cloud provider network, wherein the compute instance is a first compute instance, and wherein the first role is associated with a first user and permits the bastion server to send public keys to the first compute instance but does not permit the bastion server to send public keys to a second compute instance running in the private subnet, and wherein the method further comprises:
  attaching a second role to the bastion server, wherein the second role is associated with a second user of the cloud provider network and permits the bastion server to send public keys to the second compute instance;
  obtaining second security credentials based on the second role; and
  establishing a third SSH connection with the second compute instance running in the private subnet, wherein the third SSH connection is associated with the second user of the cloud provider network.

6. The computer-implemented method of claim 4, wherein the security credentials are associated with a role attached to the bastion server by an identity and access management service of the cloud provider network, wherein the role is associated with a policy configuration managed by the identity and access management service and that defines permissions for entities assuming the role to perform actions within the cloud provider network, and wherein the policy configuration includes a policy that permits the bastion server to send public keys to the compute instance and to establish SSH connections with the compute instance.

7. The computer-implemented method of claim 4, wherein each of the security credentials and the public/private key pair is temporary and expires after a defined period of time.

8. The computer-implemented method of claim 4, wherein the security credentials are obtained from the instance metadata by an SSH application running on the bastion server, and wherein the SSH application establishes the second SSH connection with the compute instance running in the private subnet.

9. The computer-implemented method of claim 4, wherein the compute instance running in the private subnet is a first compute instance, and wherein the method further comprises:
  receiving, by the bastion server, a request to establish a third SSH connection with a second compute instance running in the private subnet, wherein the request to establish the third SSH connection requests to use SSH agent forwarding to establish the third SSH connection, and wherein the bastion server and the second compute instance both have stored a same public key; and
  establishing the third SSH connection using SSH agent forwarding.

10. The computer-implemented method of claim 9, wherein the computing device is a first computing device, wherein the same public key is stored at both the bastion server and the second compute instance based on requests sent from a second computing device associated with a role managed by an identity and access management service of the cloud provider network, and wherein the role is associated with a policy that permits entities assuming the role to send public keys to both the bastion server and the second compute instance.

11. The computer-implemented method of claim 4, wherein the first SSH connection is established responsive to a request received from a SSH client application running on the computing device, and wherein the SSH client application is provided by an operator of cloud provider network, and wherein the SSH client application generates a temporary public/private key pair used to establish the first SSH connection.

12. The computer-implemented method of claim 4, wherein the private subnet includes a plurality of compute instances including the compute instance, and wherein the bastion server is associated with a role provided by an identity and access management service of the cloud provider network and that permits the bastion server to establish SSH connections with any of the plurality of compute instances.

13. The computer-implemented method of claim 4, wherein the bastion server establishes the second SSH connection responsive to a request, received from the computing device via the first SSH connection, to establish the second SSH connection.

14. The computer-implemented method of claim 4, wherein the compute instance is assigned to a security group of the virtual private network, and wherein the security group includes a rule that permits SSH connections from the bastion server.

15. A system comprising:
  a first one or more electronic devices to implement a first Secure Shell (SSH) application running on a bastion server in a cloud provider network, wherein the bastion server is running in a public subnet of a virtual private network of the cloud provider network, and wherein the first SSH application includes instructions that upon execution cause the first SSH application to:
- establish a first SSH connection with a computing device, wherein the computing device is on a network that is outside of the virtual private network,
- obtain, from instance metadata associated with the bastion server, security credentials that enable the bastion server to send public keys to a compute instance running in a private subnet of the virtual private network,
- send a public key of a public/private key pair to the compute instance,
- establish, using a private key of the public/private key pair, a second SSH connection with the compute instance running in the private subnet; and a second one or more electronic devices to implement compute instance, the compute instance including instructions that upon execution cause the compute instance to:
- receive the public key,
- store the public key in an authorized keys file, and
- establish, using the public key, the second SSH connection with the bastion server.

16. The system of claim 15, wherein the security credentials are first security credentials associated with a first role attached to the bastion server by an identity and access management service of the cloud provider network, wherein the compute instance is a first compute instance, and wherein the first role is associated with a first user and permits the bastion server to send public keys to the first compute instance but does not permit the bastion server to send public keys to a second compute instance running in the private subnet, wherein a second role is attached to the bastion server, wherein the second role is associated with a second user of the cloud provider network and permits the bastion server to send public keys to the second compute instance, and wherein the first SSH application further includes instructions that upon execution cause the first SSH application to:
- obtain second security credentials based on the second role, and
- establish a third SSH connection with the second compute instance running in the private subnet, wherein the third SSH connection is associated with the second user of the cloud provider network.

17. The system of claim 15, wherein the security credentials are associated with a role attached to the bastion server by an identity and access management service of the cloud provider network, wherein the role is associated with a policy configuration managed by the identity and access management service and that defines permissions for entities assuming the role to perform actions within the cloud provider network, and wherein the policy configuration includes a policy that permits the bastion server to send public keys to the compute instance and to establish SSH connections with the compute instance.

18. The system of claim 15, wherein each of the security credentials and the public/private key pair is temporary and expires after a defined period of time.

19. The system of claim 15, wherein the security credentials are obtained from the instance metadata by an SSH application running on the bastion server, and wherein the SSH application establishes the second SSH connection with the compute instance running in the private subnet.

20. The system of claim 15, wherein the compute instance running in the private subnet is a first compute instance, and wherein the first SSH application further includes instructions that upon execution cause the first SSH application to:
- receive a request to establish a third SSH connection with a second compute instance running in the private subnet, wherein the request to establish the third SSH connection requests to use SSH agent forwarding to establish the third SSH connection, and wherein the bastion server and the second compute instance both have stored a same public key;
- establish the third SSH connection using SSH agent forwarding.

* * * * *